United States Patent Office 3,459,821
Patented Aug. 5, 1969

3,459,821
HYDROCRACKING PROCESS
Robert M. Engelbrecht, St. Louis, James C. Hill Chesterfield, and Richard N. Moore, St. Louis, Mo., assignors to Monsanto Company, St. Louis, Mo., a corporation of Delaware
No Drawing. Filed Dec. 27, 1966, Ser. No. 604,589
Int. Cl. C07c *15/02, 3/40*
U.S. Cl. 260—668                                                                     10 Claims

ABSTRACT OF THE DISCLOSURE

Ethyl substituted aromatic compounds are made by subjecting alkyl substituted aromatic compounds having an alkyl substituent of at least three carbon atoms to elevated temperatures in the presence of hydrogen and a modifying agent. The modifying agent is hydrogen bromide or a component that forms hydrogen bromide under the reaction conditions.

---

The present invention relates to a process for the hydrocracking of alkyl aromatic compounds. More particularly, the present invention relates to a process for preparing ethyl-substituted aromatic compounds by the non-catalytic hydrocracking of alkyl aromatic compounds having at least three carbon atoms in an alkyl substituent.

One of the most important groups of monomers for the production of useful polymeric compositions are benzenes having monoethylenically unsaturated hydrocarbonyl substituents, particularly styrene. Styrene monomer is, therefore, in ever increasing demand. Generally, styrene is obtained by the dehydrogenation of ethylbenzene. Theretofore, the amount of styrene available is to a large extent dependent upon the production of ethylbenzene. For this reason, there is a continuous search for new sources and means of producing ethylbenzene. Another group of monomers having potential similar to styrene are the vinyl naphthalenes. These monomers, as with styrene, are generally prepared by the dehydrogenation of the corresponding alkyl aromatic hydrocarbon. As a result of several factors including a lack of availability of the ethyl naphthalenes, the vinyl naphthalenes have not found the prominence of styrene. Therefore, there is a need for new sources and/or means for readily producing the ethyl naphthalenes from which the vinyl naphthalenes are prepared in order that the true potential of the vinyl naphthalenes as building blocks in the polymer industry may be realized.

It is an object of the present invention to provide a noncatalytic process for the preparation of ethyl-substituted aromatic compounds. An additional object of the present invention is to provide a non-catalytic hydrocracking process for the conversion of alkyl aromatic compounds having at least three carbon atoms in an alkyl side-chain to ethyl-substituted aromatic compounds. A specific object of the present invention is to provide a noncatalytic hydrocracking process for the production of ethylnaphthalenes and ethylbenzene from alkyl naphthalense and alkyl benzenes having at least three carbon atoms in an alkyl substituent. Another object of the present invention is to provide a noncatalytic thermal hydrocracking process whereby the alkyl side-chains of at least three carbon atoms which are substituents to aromatic rings may be selectively cracked to an alkyl side-chain of two carbon atoms without cleavage from the aromatic ring. Additional objects will become apparent from the following description of the invention herein disclosed.

The present invention, which fulfills these and other objects, is a process for the hydrocracking of alkyl aromatic compounds having an alkyl substituent of at least three carbon atoms to produce ethyl-substituted aromatic compounds, the process comprising subjecting a feedstock containing alkyl-substituted aromatic compounds having an alkyl substituent of at least three carbon atoms to a temperature within the range of 500 to 700° C. and a pressure within the range of 100 to 5,000 p.s.i.g. in a thermal, noncatalytic reaction zone in the presence of hydrogen and a modifying agent selected from the group consisting of hydrogen bromide and compounds and elements which under the conditions of the reaction zone will form hydrogen bromide. By the process of the present invention, substantially improved yields of ethyl-substituted aromatic compounds, particularly ethylbenzene, may be obtained.

In order to further describe as well as to specifically illustrate the present invention, the following examples are presented. These examples are not to be construed as in any manner limiting the present invention.

EXAMPLE I

Normal butylbenzene was metered into a tubular reactor at a rate of 1 gram millimole per minute in admixture with 7 millimoles of hydrogen. The tubular reactor was approximately 7¼ inches in length and had a variable diameter ranging from ¼ inch at the entrance end to ⅜ inch at the exit end. The effective reactor volume was approximately 2.7 ml. The residence time of the n-butylbenzene in the reactor was about 12 seconds. During the run, the temperature of the reactor was increased in increments of 25 to 50° C. from about 450° C. to 725° C. The system was allowed to reach steady-state at each temperature before measuring the feed rate and obtaining a product sample for analysis. The pressure within the reactor was controlled at 700 p.s.i.g. The table below presents the recovery of the product at each of the temperature levels of this run in grams per 100 grams of n-butylbenzene feed introduced into the reactor during the temperature level sampling period sampled.

TABLE I.—REACTION TEMPERATURE, °C.

| Temperature, °C | 469 | 500 | 553 | 601 | 651 | 675 | 701 |
|---|---|---|---|---|---|---|---|
| Benzene | 0.1 | .4 | 2.2 | 7.3 | 24.6 | 40.5 | 44.9 |
| Toluene | 0.5 | 1.5 | 7.2 | 13.7 | 13.7 | 8.0 | 3.1 |
| Ethylbenzene | 0.9 | 3.3 | 18.0 | 32.8 | 20.3 | 7.0 | 1.5 |
| Styrene | 0.2 | 0.9 | 2.9 | 2.4 | .07 | 0.2 | 0.0 |
| n-Butylbenzene | 96.9 | 90.5 | 55.3 | 14.7 | 1.2 | 0.1 | 0.1 |

EXAMPLE II

A second run was conducted in the same manner as that described above in Example I, with the exception that the n-butylbenzene fed to the reactor contained 1 mol percent bromobenzene. The product recovery at the various temperature levels is presented in the table below as grams per 100 grams of n-butylbenzene feed to the reactor during the temperature level period sampled.

TABLE II.—REACTION TEMPERATURE, °C.

| Temperature, °C | 445 | 496 | 551 | 601 | 645 | 672 | 696 |
|---|---|---|---|---|---|---|---|
| Benzene | .6 | .9 | 1.8 | 4.0 | 9.9 | 24.2 | 37.3 |
| Toluene | .2 | 2.3 | 13.0 | 17.5 | 17.0 | 13.7 | 10.4 |
| Ethylbenzene | .2 | 3.0 | 25.6 | 45.1 | 38.9 | 19.6 | 7.6 |
| Styrene | | 0.6 | 3.7 | 1.9 | 1.0 | 0.7 | 0.3 |
| n-Butylbenzene | 98.5 | 90.0 | 34.6 | 2.9 | 0.7 | 0.4 | 0.2 |

From a comparison of Examples I and II above, it is seen that a substantial increase in the yield of ethylbenzene is obtained in Example II in which the run was carried out in accordance with the process of the present invention. Further, with regard to Example II, it should be noted that the particular temperature at which the process of the present invention is carried out is very important with respect to the ethylbenzene yield.

To further demonstrate the efficiency of the process of the present invention, two comparative experimental runs are made with n-propylnaphthalene as the feed in both runs. In one of the runs, bromopropane is added as 1.5 mol percent of the resulting mixture. The temperature in each of the runs is 675° C., the pressure 650 p.s.i.g. and the residence time is approximately 15 seconds. It is found that significantly improved yields of ethylnaphthalene are obtained in the run in which bromopropane is added as a modifying agent.

The process of the present invention provides a means for producing ethyl substituted aromatic compounds from aromatic compounds having alkyl substituents of greater than two carbon atoms by hydrocracking such alkyl substituents to two carbon atoms. The alkyl aromatic compounds may be mono-nuclear or poly-nuclear and may have one or more alkyl substituents. For example, the feeds to the present process include mono-alkyl benzenes, di- and poly-alkyl benzenes, mono-alkyl naphthalenes, di- and poly-alkyl naphthalenes, mono-, di- and poly-alkyl anthracenes, mono-di-, and poly-alkyl phenanthrenes, mono-, di-, and poly-alkyl pyrenes, mono-, di-, and poly-alkyl chrysenes, and the like. Such alkyl aromatic compounds must have at least one alkyl substituent of greater than two carbon atoms. The alkyl substituents to the aromatic compounds to which the present process finds applicability may be straight or branched chain in structure. Several non-limiting examples of alkyl aromatic compounds which may be hydrocracked in accordance with the process of the present invention are such aromatic hydrocarbons as n-propyl benzene, n-butyl benzene, n-pentyl benzene, isobutyl benzene, (3,3-dimethylbutyl) benzene, (3-ethylpentyl)benzene, (3,3-dimethylpentyl) benzene, n-hexyl benzene, isopentyl benzenes, n-propyl toluenes, n-butyl toluenes, n-pentyl toluenes, n-dodecylbenzene, tridecylbenzenes, n-propyl naphthalene, n-butyl naphthalene, isobutyl naphthalenes, dipropyl benzenes, dipropyl naphthalenes, propyl butyl naphthalenes, propyl butyl benzenes, methyl propyl naphthalenes, n-propyl phenanthrenes, n-pentylphenanthrenes, methylbutylanthrenes, dipropylanthranes, n-propyl chrysene and the like. In addition to the above, the alkyl substituted aromatic compounds may contain substituents other than alkyl groups. For example, the alkyl aromatic compounds may have hydroxyl, alkoxy, alkoxycarbonyl, halogen, sulfide, sulfate, nitrate, amino, nitrile, nitro and other substituents in addition to the alkyl substituents. Also, the alkyl aromatic compound may contain elements other than carbon in the aromatic nucleus. For example, the present invention may be utilized in the hydrocracking of alkyl pyridines, alkyl pyrans, alkyl furans, alkyl thiophenes and the like. The present invention, however, is most useful in the hydrocracking of mono-alkyl aromatic hydrocarbons of which the alkyl substituent contains 3 to 10 carbon atoms. In the preferred practice of the present invention, the mono-alkyl aromatic hydrocarbons are mono-alkyl benzenes or mono-alkyl naphthalenes. Of course, the present hydrocracking process is not limited to cracking the above-mentioned compounds individually but may be used to hydrocrack these compounds in combination with one another as well as other hydrocarbons.

In carrying out the process of the present invention, in order to obtain practical yields of ethyl-substituted aromatic compounds, it is necessary to maintain the temperature within relatively critical limitations. Most often, the temperature will be maintained within the range of from approximately 500 to 700° C., preferably within the range of from about 550 to 650° C. Generally, the present process is operated at superatmospheric pressures ranging from 100 to 10,000 p.s.i.g. and higher. However, the present invention preferably is operated at pressures ranging from 500 to 5,000 p.s.i.g. As a practical matter, the present invention usually is operated within the range of 500 to 1,000 p.s.i.g.

The residence time of the alkyl-substituted aromatic compounds within the reaction chamber usually is not less than one second or greater than 30 seconds. It is preferred, however, that the residence time of the alkyl-substituted aromatic compounds within the reaction zone be not less than 5 seconds or greater than 20 seconds.

The modifying agents useful in the present invention are hydrogen bromide and compound or elements which under the conditions of the reaction zone will form hydrogen bromide. The modifying agent compounds may be either organic or inorganic compounds. In addition to bromine, such other elements as carbon, hydrogen, sulfur, oxygen, nitrogen, chlorine, iodine, and the like may be present in the modifying compound. If the compond is organic, it may be saturated or unsaturated, aliphatic or aromatic, straight-chained, branched-chain or cyclic in structure. Generally, it may be stated that the modifying compounds are those compounds which under the conditions of the reaction chamber will decompose or otherwise form hydrogen bromide. This includes not only those compounds of which bromine is a part, but also includes gaseous bromine. Bromine-containing compounds within the scope of the present invention include the following nonlimiting examples.

| Column I | Column II | Column III |
|---|---|---|
| 2-bromopropane | Bromobenzene | Dibromoethanoic acid |
| 1-bromobutane | α-bromoacetanilide | m-Dibromobenzene. |
| 1-bromopentane | o-Dibromobenzene | Benzoyl bromide. |
| 2-bromopentane | p-Dibromobenzene | 3-bromohexane. |
| 2-bromohexane | 2-bromo-1,4-benzenediol | 2-bromo-4-methylhexane. |
| 3-bromoheptane | o-Bromotoluene | Benzene carbonyl bromide. |
| m-Bromotoluene | 2-bromo-4-ethylhexane | p-Bromotoluene. |
| 4-bromo octane | 1,3,5-dibromotoluene | o-Bromo-chlorobenzene. |
| m-Bromo-chlorobenzene. | 1-bromononane | p-Bromo-chlorobenzene. |
| 2-bromoethanol | 2-bromonaphthalene | 2-bromodecane. |
| 2-bromo-6-methyl | 2-bromodiphenyl | Cyclohexylbromide. |
| 3,3-bromomethyldecane. | 1-bromododecane | Hydrogen bromide. |
| Bromine gas | 2-bromo-2-pentene | 3-bromo-4-octene. |

The bromine-containing compounds most useful in the practice of the present invention are those which contain the elements carbon and/or hydrogen. These compounds are the bromine-substituted hydrocarbons and hydrogen bromide. There is no critical limit to the molecular weight of the modifying compound other than one of practicality in handling. From a pure practical standpoint, those compounds which are normally liquid are useful with those that are normally gaseous being preferred. In the practice of the present invention, the preferred compounds are the mono- and di-bromine-substituted hydrocarbons of no more than six carbon atoms and hydrogen bromide.

The amount of the modifying agent used in carrying out the process of the present invention most often is sufficient to result in a concentration of hydrogen bromide obtainable therefrom in the reaction zone such as to cause a molar ratio of hydrogen bromide to alkyl aromatic compound within the range of 0.001:1 to 0.1:1. As a result, 0.001 to 2.0 mols of modifying agent per mol of alkyl aromatic hydrocarbon are most often employed. The optimum amount of modifying agent used will depend upon the conditions of the reaction zone and the modifying agent chosen. With milder conditions within the ranges herein disclosed, many of the modifying agents do not yield a mol of hydrogen bromide for each mol of modifying agent. Therefore, larger quantities of these materials are required to obtain the above-defined molar concentrations of hydrogen bromide in the reaction zone. Preferably, however, the mol ratio of modifying agent to alkyl aromatic compound used in carrying out the process of the present invention is within the range of 0.002:1 to 0.5:1. In addition to the modifying agent, hydrogen is added to the reaction zone in quantities sufficient to produce a molar ratio of 1 to 20 mols hydrogen per mole of alkyl aromatic compound, preferably 2 to 8 mols hydrogen per mol of alkyl aromatic compound.

The method whereby the modifying agent is added to the reaction zone is not critical to the present invention and may be carried out in virtually any manner. The only critical feature in this addition is that there be a thorough and intimate contact between the alkyl aromatic compound and the modifying agent. The modifying agent may be introduced concurrently with the alkyl aromatic compound or it may be introduced counter-current or cross-current to the flow of the feed. The best method whereby the modifying agent is brought into contact with the alkyl aromatic compounds will, of course, as a practical matter, vary with the physical properties of the modifying agent and whether or not it is desired to operate the process of the present invention as a continuous or batch process. To find the best method of contacting the modifying agent with the alkyl aromatic compound is well within the ability of those skilled in the art and no further description is believed necessary.

What is claimed is:

1. A process for the production of ethyl-substituted aromatic compound which comprises subjecting alkyl aromatic compounds having an alkyl substituent of at least three carbon atoms to a temperature within the range of 500 to 700° C. and a pressure within the range of 100 to 10,000 p.s.i.g. in a noncatalytic, thermal reaction zone in the presence of hydrogen and a modifying agent selected from the group consisting of hydrogen bromide and compounds and elements which under the conditions of the reaction zone will form hydrogen bromide.

2. The process of claim 1 wherein the temperature is within the range of 550° to 650° C.

3. The process of claim 1 wherein the pressure is within the range of 500 to 5,000 p.s.i.g.

4. The process of claim 1 wherein the alkyl aromatic compound is a mono-alkyl aromatic hydrocarbon in which the alkyl substituent has 3 to 10 carbon atoms.

5. The process of claim 1 wherein the modifying agent is added to the reaction zone in a molar ratio to the alkyl aromatic compounds within the range of 0.001:1 to 2:1.

6. The process of claim 1 wherein the hydrogen is present in a mol ratio to the alkyl aromatic compound within the range of 1:1 to 20:1.

7. The process of claim 1 wherein the modifying agent is a bromine-substituted hydrocarbon of no more than six carbon atoms and selected from the group consisting of mono-bromine-substituted hydrocarbons and di-bromine-substituted hydrocarbons.

8. The process of claim 7 wherein the modifying agent is bromobenzene.

9. The process of claim 7 wherein the modifying agent is bromopropane.

10. The process of claim 1 wherein the modifying agent is hydrogen bromide.

References Cited

UNITED STATES PATENTS

| | | | |
|---|---|---|---|
| 1,938,827 | 12/1933 | Gibbons et al. | 260—669 |
| 1,541,175 | 6/1925 | Ostromislensky et al. | 260—669 |
| 1,997,967 | 4/1935 | Gibbons et al. | 260—669 |
| 2,211,524 | 8/1940 | Stanley et al. | 260—672 |
| 2,913,397 | 11/1959 | Murray et al. | 260—672 |
| 3,222,411 | 12/1965 | Beuther et al. | 260—672 |

PAUL M. COUGHLAN, Jr., Primary Examiner

C. R. DAVIS, Assistant Examiner

U.S. Cl. X.R.

260—669, 672